(12) United States Patent
Lam et al.

(10) Patent No.: US 9,942,826 B2
(45) Date of Patent: Apr. 10, 2018

(54) APPARATUS AND METHOD FOR COMMUNICATION PATH RECOVERY WITH ADAPTIVE CHANNEL BANDWIDTH IN WIRELESS MESH NETWORK

(71) Applicant: Hong Kong Kingston Limited, Kowloon (CN)

(72) Inventors: Patrick Pak Kit Lam, Kowloon (HK); Yat Hong Tsui, New Territories (CN); Winfred Wai Lap Fan, Kowloon (CN)

(73) Assignee: Hong Kong Kingston Limited, Kowloon (HK)

( * ) Notice: Subject to any disclaimer, the term of this patent is extended or adjusted under 35 U.S.C. 154(b) by 30 days.

(21) Appl. No.: 14/838,170

(22) Filed: Aug. 27, 2015

(65) Prior Publication Data

US 2017/0064606 A1    Mar. 2, 2017

(51) Int. Cl.
*H04W 40/12* (2009.01)
*H04L 12/703* (2013.01)
*H04W 40/22* (2009.01)
*H04L 12/729* (2013.01)
*H04W 84/18* (2009.01)

(52) U.S. Cl.
CPC ........... *H04W 40/12* (2013.01); *H04L 45/125* (2013.01); *H04L 45/28* (2013.01); *H04W 40/22* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 9,425,985 B1* | 8/2016 | Shousterman | H04L 47/726 |
| 2010/0159971 A1* | 6/2010 | Herscovich | H04B 7/061 455/500 |
| 2010/0177755 A1* | 7/2010 | Chu | H04W 72/1252 370/338 |

* cited by examiner

*Primary Examiner* — Jamal Javaid
*Assistant Examiner* — Saad Khawar
(74) *Attorney, Agent, or Firm* — Morrison & Foerster LLP

(57) ABSTRACT

A mesh network relaying device includes at least a first radio, a second radio, and a third radio. During normal operation, the device communicates with other network nodes via the first and second radios, the radios operating at the best available bandwidth. When the device identifies a communication link failure in one of the first and second radios, the device activates the third radio and operates the first, second, and/or third radios at narrower bandwidths. When the communication link failure is resolved, the device deactivates the third radio, and resumes communication via the first and second radios at wider bandwidth.

25 Claims, 5 Drawing Sheets

APPARATUS AND METHOD FOR COMMUNICATION PATH RECOVERY WITH ADAPTIVE CHANNEL BANDWIDTH IN WIRELESS MESH NETWORK

BACKGROUND

1. Field

The present disclosure relates to wireless mesh networks.

2. Description of Related Art

Wireless mesh networks (WMN) are useful in many applications. Mesh networks have lower up-front costs as compared with traditional networks. Mesh networks also provide flexibility in incremental deployment and ease of maintenance.

A wireless mesh network is formed using a backbone of relaying devices. These relaying devices can be referred to as wireless mesh network routers (WMR). These relaying devices propagate a network packet through the mesh network from a source to a destination by "hopping" the packet from one relaying device to another until the packet reaches its destination.

SUMMARY

Some wireless mesh networks perform sub-optimally because the relaying devices in their backbones do not leverage the full bandwidth that is available for communication.

The present techniques provide devices, methods, and computer processor-executable instructions for efficient wireless mesh network communication, particularly during periods of communication failure between relaying devices in the backbone. These techniques advance the field of wireless mesh networking by advancing network performance. It should be appreciated that as network-connected devices become more portable, wireless network performance will become increasingly important.

In some embodiments, a computer-enabled method, comprises: at a first wireless network relaying device configured to operate in a wireless network backbone, wherein the first wireless network relaying device has at least a first radio, a second radio, and third radio: receiving data representing network traffic using the first radio, the first radio operating at a first bandwidth; determining whether wireless communication with a second wireless network relaying device meets a condition; and in accordance with a determination that the wireless communication with the second wireless network relaying device meets the condition: changing the bandwidth of the first radio to a different bandwidth; and sending, to a third wireless network relaying device, data representing the network traffic, using the third radio, at a bandwidth different than the first bandwidth.

In some embodiments, a computer-enabled method, comprises: at a first wireless network relaying device configured to operate in a wireless network backbone, wherein the first wireless network relaying device has at least a first radio, a second radio, and third radio: receiving data representing network traffic using the first radio, the first radio operating at a first bandwidth; determining whether a third wireless network relaying device is experiencing a communication condition; in accordance with a determination that the third wireless network relaying device is not experiencing a communication condition: sending, to a second wireless network relaying device, data representing the network traffic, using the second radio, at the first bandwidth; and in accordance with a determination that the third wireless network relaying device is experiencing a communication condition: sending, to the second wireless network relaying device, data representing the network traffic, using the second radio, at a bandwidth different than the first bandwidth; and establishing wireless communication with the third wireless network relaying device, using the third radio, at a bandwidth different than the first bandwidth.

In some embodiments, a non-transitory computer-readable storage medium having computer-executable instructions, wherein the computer-executable instructions, when executed by one or more processors of a wireless network relaying device, causes the wireless network relaying device to change the operating bandwidth of at least one radio of the wireless network relaying device, the computer-executable instructions comprising instructions for: receiving data representing network traffic using a first radio of the wireless network relaying device, the first radio operating at a first bandwidth; determining whether wireless communication with a second wireless network relaying device meets a condition; and in accordance with a determination that the wireless communication with the second wireless network relaying device meets the condition: changing the bandwidth of the first radio to a different bandwidth; and sending, to a third wireless network relaying device, data representing the network traffic, using a third radio of the wireless network relaying device, at a bandwidth different than the first bandwidth.

In some embodiments, a non-transitory computer-readable storage medium having computer-executable instructions, wherein the computer-executable instructions, when executed by one or more processors of a wireless network relaying device, causes the wireless network relaying device to change the bandwidth of at least one radio of the wireless network relaying device, the computer-executable instructions comprising instructions for: receiving data representing network traffic using a first radio of the wireless network relaying device, the first radio operating at a first bandwidth; determining whether a third wireless network relaying device is experiencing a communication condition; in accordance with a determination that the third wireless network relaying device is not experiencing a communication condition: sending, to a second wireless network relaying device, data representing the network traffic, using a second radio of the wireless network relaying device, at the first bandwidth; and in accordance with a determination that the third wireless network relaying device is experiencing a communication condition: sending, to the second wireless network relaying device, data representing the network traffic, using the second radio, at a bandwidth different than the first bandwidth; and establishing wireless communication with the third wireless network relaying device, using a third radio of the wireless network relaying device, at a bandwidth different than the first bandwidth.

In some embodiments, a network relaying device comprising: a first radio, a second radio, and a third radio coupled to one or more processors; a memory coupled to the one or more processors; and one or more programs, wherein the one or more programs are stored in the memory and configured to be executed by the one or more processors, the one or more programs including instructions for: receiving data representing network traffic using the first radio, the first radio operating at a first bandwidth; determining whether wireless communication with a second wireless network relaying device meets a condition; and in accordance with a determination that the wireless communication with the second wireless network relaying device meets the condition: changing the bandwidth of the first radio to a different bandwidth; and sending, to a third wireless network relaying device, data representing the network traffic, using the third radio, at a bandwidth different than the first bandwidth.

In some embodiments, network relaying device comprising: a first radio, a second radio, and a third radio coupled to one or more processors; a memory coupled to the one or more processors; and one or more programs, wherein the one or more programs are stored in the memory and configured to be executed by the one or more processors, the one or more programs including instructions for: receiving data representing network traffic using the first radio, the first radio operating at a first bandwidth determining whether a third wireless network relaying device is experiencing a communication condition; in accordance with a determination that the third wireless network relaying device is not experiencing a communication condition: sending, to a second wireless network relaying device, data representing the network traffic, using the second radio, at the first bandwidth; and in accordance with a determination that the third wireless network relaying device is experiencing a communication condition: sending, to the second wireless network relaying device, data representing the network traffic, using the second radio, at a bandwidth different than the first bandwidth; and establishing wireless communication with the third wireless network relaying device, using the third radio, at a bandwidth different than the first bandwidth.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

For example, the following description (including figures) describes examples of wireless mesh network relaying devices having three radios and three antennas. However, it should be appreciated that the described relaying devices can have more than three radios. It should also be appreciated that a given radio can be connected to more than one antenna. As another example, the following description describes wireless communications in the 5 GHz frequency range, and further describes channelization that results in 160 MHz and 80 MHz bandwidths for communication within the frequency range. It should be appreciated that communications frequencies can change and that channelization standards can vary. Thus, the various embodiments are not intended to be limited to the examples described herein and shown, but are to be accorded the scope consistent with the claims.

The following description uses words "first," "second," etc. to describe various elements. These words are used to distinguish one element from another. For example, a first radio could be termed a second radio, and, similarly, a second radio could be termed a first radio, without departing from the scope of the various described embodiments. The first radio and the second radio are both radios, but they are not the same radio. As another example, a first bandwidth can be termed a second bandwidth, and, similarly, a second bandwidth could be termed a first bandwidth, but they are not the same bandwidth.

Figure 1:
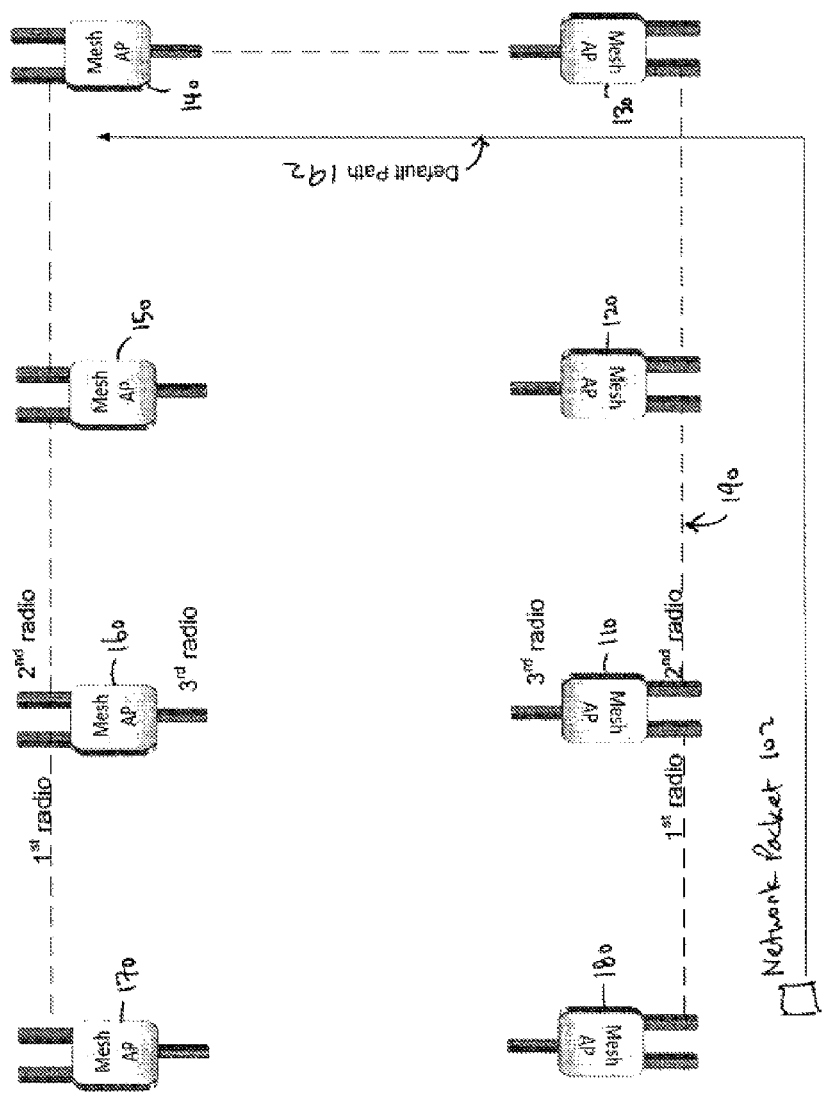
FIG. 1 depicts exemplary wireless mesh network relaying devices of a wireless mesh network backbone in accordance with some embodiments.

FIG. 1 illustrates an exemplary wireless mesh network backbone formed by various wireless mesh network relaying devices. For brevity, these relaying devices are referred to as wireless mesh network routers or WMR. As seen in FIG. 1, exemplary WMRs 110, 120, 130, 140, 150, 160, 170, and 180 form wireless mesh network backbone 100. Exemplary WMRs 110, 120, 130, 140, 150, 160, 170, and 180 each incorporates at least one network interface. Also, at least exemplary WMRs 110 and 160 each incorporates at least three radios. Each radio is connected to at least one corresponding antenna. The WMRs of wireless mesh network backbone 100 are connected so that network data, such as a network packet 102 can travel from source WMR 180 to destination WMR 140 through intermediate WMRs 110, 120, and 130, as indicated by default path 192. It is noted that wireless mesh network backbone 100 is exemplary in nature. It is possible to have, for example, a wireless mesh network backbone having as few as two WMRs.

A given WMR transmits data to one or more neighboring WMR via its network interface, as supported by the radios and antennas of the WMR. In FIG. 1, WMR 110 has a first radio that is connected to WMR 180 and transmits data through its first radio to WMR 180. Also, WMR 110 has a second radio that is connected to WMR 120 and transmits data through its second radio to WMR 120 through communication link 190. In this way, data from WMR 180 can be sent to WMR 120 by passing through intermediate WMR 110, via communication link 190.

In some embodiments, during normal operation, the third radios of WMRs 110 and 160 are deactivated. For example, the third radio is powered-off (although its parent WMR is powered-on). As another example, the third radio is powered-on but idle in that it is not relaying network packets received at the first radio and the second radio. As another example, the third radio is in a low-power consumption or standby mode. The third radio is reserved as a spare that becomes activated when the WMR detects a failure condition in the first or second radios.

During normal operation, the first and second radios of WMR 110 (among others) operate at the widest bandwidth that is allowed by the channelization arrangements of the particular communication standard that is in use to form the wireless mesh network backbone. For example, the first radio of WMR 110 communicates with WMR 180 at 160 MHz and the second radio of WMR 110 communicates with WMR 120 at 160 MHz, during normal operation.

Maximum utilization of radio bandwidth is important as the performance of the resulting mesh network depends on the performance of its constituent WMRs. In the context of wireless communication, when two or more channels overlap each other, interference between the channels impacts the performance of the wireless transmission. Wider channels (e.g., 160 MHz bandwidth) usually give higher performance than narrower channels (e.g., 80 MHz bandwidth). Therefore, operating nearby wireless channels with the widest possible non-overlapping channels improves network performance. But, the number of non-overlapping channels of certain bandwidth within a frequency band is limited. For example, two non-overlapping 160 MHz channels can exist within the frequency band between 5180 MHz and 5805 MHz, normally called the ISM band. Alternatively, three or more 80 MHz channels (depending on the regulations of the local jurisdiction) can exist within the same ISM band. Thus, although it may be desirable to use channels of 160 MHz bandwidth to optimize wireless communication performance, a tradeoff exists in that the number of available wide-bandwidth channels may be limited. For example, in the ISM band, there are just two 160 MHz channels.

When a communication link condition (e.g., a communication failure) is detected, a WMR (e.g., WMRs 110, 120, 130, 140, 150, 160, 170, and/or 180) activates a third radio for communication. To achieve optimal performance during operation in this mode, which may be referred to as recovery mode, three channels—one for each radio—is used, with each channel running at a narrower bandwidth, such as 80 MHz (as compared with, e.g., 160 MHz during normal operation). This adaptive adjustment in the bandwidth of a WMR's radios, depending on the mode of operation, yields better performance particularly during recovery operation, as a WMR leverages the most of the available bandwidth depending on the number of operating radios.

In some examples, a WMR has a processor that monitors the communication performance of its radios. Communication performance that meets a threshold condition (e.g., a failure condition) triggers operation in recovery mode. In some examples, if the communication link quality of a radio is below a predetermined value (e.g., −90 dB), the processor considers the communication link to have failed and invokes recovery mode on the corresponding WMR. As another example, if a radio does not receive a threshold amount of data within a predetermined time (e.g., three seconds), the processor considers the communication link to have failed and then invokes recovery mode. As an additional example, the processor considers the link to have failed if it detects that there is a radio hardware failure. In some examples, as discussed above, WMR operation in the recovery mode entails activation of an additional radio and reduction of the operating bandwidths of the WMR's radio from a wider bandwidth (e.g., 160 MHz across two radios) to a narrower bandwidth (e.g., 80 MHz across three radios).

In some examples, a WMR exchanges communication performance information, such as communication link quality information, with one another. For example, WMR 110 can be configured to inform one or more of the other WMRs in wireless mesh network backbone 100 of its communication performance. This configuration is performed, for example, through a WMR configuration setting user interface. In some examples, a wireless access controller of wireless mesh network backbone 100 (not illustrated) monitors the communication performance of WMRs in the wireless mesh network backbone.

Communication of performance information among WMRs in a wireless mesh network backbone enables other WMRs in the backbone to recognize that a particular WMR has entered recovery mode. For example, if WMR 110 is configured to inform WMR 160 of its communication degradation with WMR 120, then, if communication link 190 fails, WMR 110 can enter recovery mode and request that WMR 160 also enter recovery mode so that WMR 110 can send network traffic to WMR 160 (instead of WMR 120), using their respective third radios. In this way, wireless mesh network backbone 100 can recover from failure of communication link 190.

Figure 2:
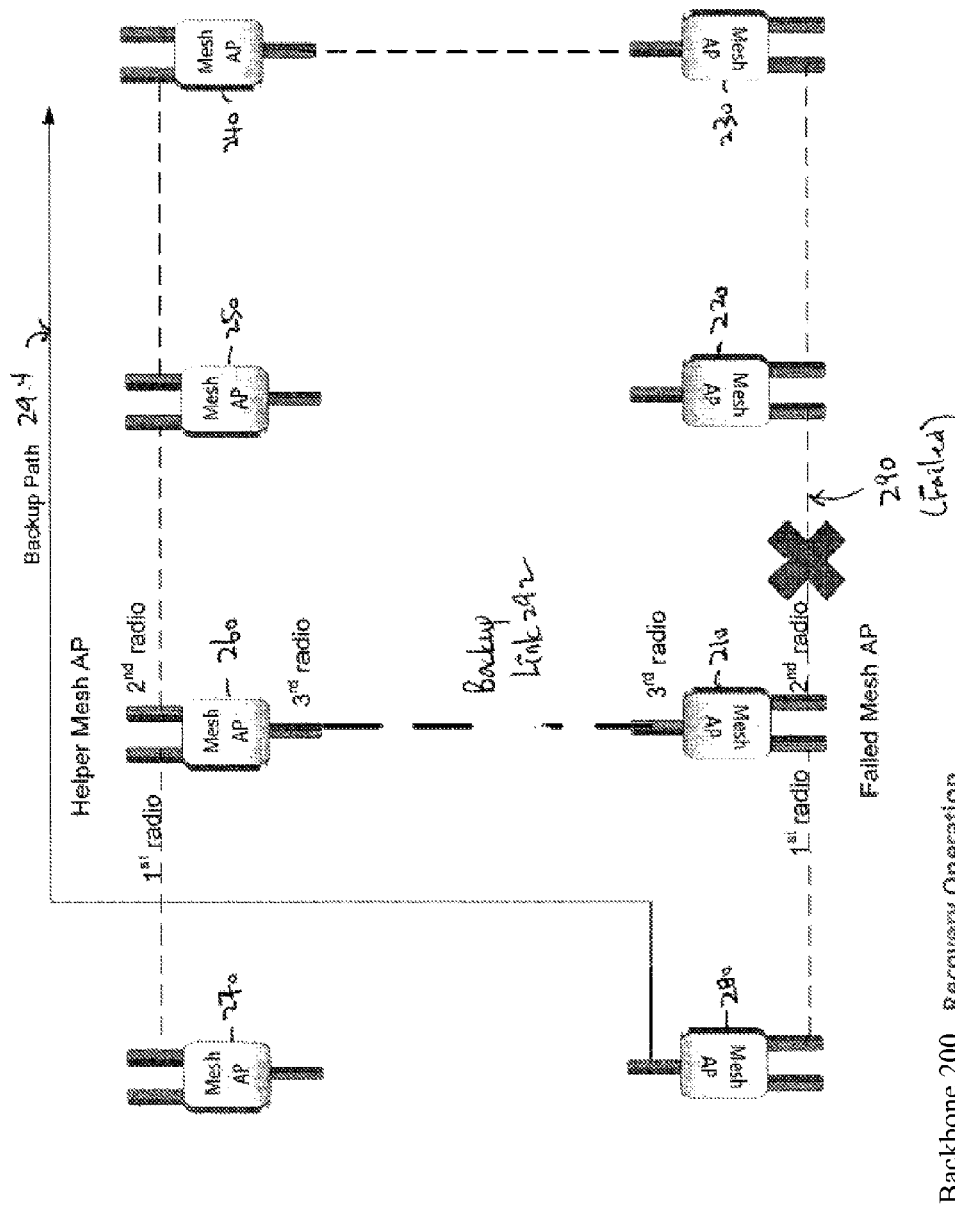
FIG. 2 depicts an exemplary failure and recovery of communications in a wireless mesh network backbone in accordance with some embodiments.

FIG. 2 illustrates an exemplary scenario in which WMRs within a wireless mesh network backbone switch from normal operation to recovery mode operation. In FIG. 2, exemplary wireless mesh network backbone 200 includes WMRs 210, 220, 230, 240, 250, 260, 270, and 280. As shown, communication link 290 between the second radio of WMR 210 and the first radio of WMR 220 is experiencing a communication failure. As discussed above, a low communication link quality or low network traffic can indicate communication failure, in addition to radio hardware failure. For example, the communication failure may be caused by severe interference from an outside source.

In some embodiments, when the processor of a WMR (e.g., WMR 210) recognizes that one of its radios is experiencing a communication failure, the processor considers WMR 210 to have "failed." In response, the processor switches WMR 210 from normal operation to operation in recovery mode. WMR 210 may be referred to as "failed" WMR 210. In recovery mode, "failed" WMR 210 activates its third radio. The three radios operate at narrower bandwidths as compared with the bandwidths used during normal operation. In some examples, the three radios operate at 80 MHz during recovery mode, as opposed to the 160 MHz bandwidth used by the first and second radios during normal operation.

In the example of FIG. 2, neighboring WMR 260 recognizes that "failed" WMR 210 has entered recovery mode, and in response, also switches into recovery mode to act as a "helper" WMR. In recovery mode, "helper" WMR 260 activates its third radio and operates its three radios at the narrower bandwidth of 80 MHz, as opposed to the 160 MHz bandwidth used by the first and second radios during normal operation. In this way, the third radios of WMR 210 and 260 form backup wireless communication link 292, thereby providing a new communication path 294 from WMR 280 to 240, through intermediate WMRs 210, 260, and 250. Note that, during normal operation of WMRs 210 and 220, backup link 292 did not exist as the third radios of WMRs 210 and 260 were deactivated during normal operation.

In some examples, "helper" WMR 260 recognizes that WMR 210 has "failed" because the WMRs of wireless mesh network backbone 200 provide one another with communication status information. In some examples, as WMR 210 enters recovery mode, it transmits requests to one or more WMRs requesting assistance. In some examples, a wireless access controller of wireless mesh network backbone 200 (not illustrated) informs WMRs in the backbone, such as WMR 260, of the failures of other WMRs in the backbone.

Backup wireless communication link 292 remains active until the "failed" WMR 210 recovers communication with "failed" WMR 220. When link quality between WMRs 210 and 220 rises above a threshold level, the processors of "failed" WMRs 210 and 220 understand that recovery mode is no longer necessary and thus re-invokes normal mode operation. In some examples, the processor of "helper" WMR 260 detects that communication link 290 has been re-established, and therefore "helper" WMR 260 also switches back operation in normal mode.

In normal operation, the third radios of WMRs 210 and 260 are both deactivated. Deactivation of the third radios in WMRs 210 and 260 leaves headroom in the communication spectrum, thereby permitting the first and second radios of WMRs 210 and 260 to resume communication at a wider bandwidth. For example, the first and second radios of WMRs 210 and 260 can step up from 80 MHz (in recovery mode) to 160 MHz during normal operation.

In this way, when a mesh network relaying device in a wireless mesh network backbone, such as backbones 100 and 200 (FIGS. 1 and 2), experiences a communication failure, the "failed" WMR and a "helper" WMR enters recovery mode to enable a backup communication path for handling network traffic in the mesh network.

As discussed above, while the examples provided with reference to FIGS. 1 and 2 describe the operation of two radios at 160 MHz bandwidth and three radios at 80 MHz bandwidth, it would be appreciated that the examples are only provided as illustrations to assist in understanding and are not meant to restrict scope of invention. For example, it is possible for wireless mesh network routers to have four radios, as well as to operate those radios at the bandwidth of 40 MHz during recovery mode.

Figure 3:
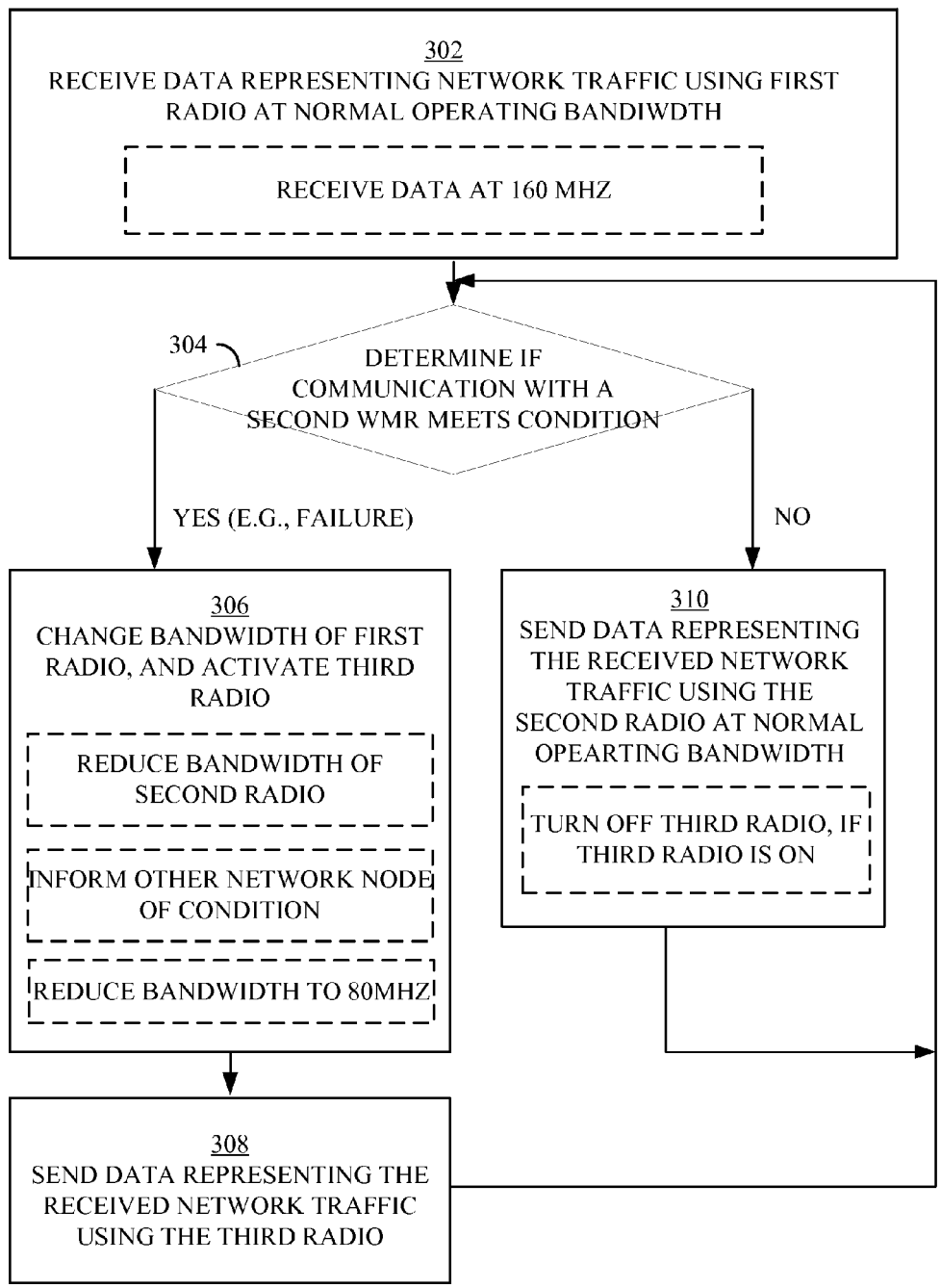
FIG. 3 is a flow diagram illustrating a process for recovering from communications conditions in accordance with some embodiments.

FIG. 3 illustrates exemplary process 300 for recovering from a network communication failure in a wireless mesh network backbone according to some embodiments. Process 300 is performed by a "failed" WMR, such as WMR 210 (FIG. 2), in a wireless mesh network backbone, in some examples. The "failed" WMR has a first radio, a second radio, and third radio, in some examples.

At block 302, the "failed" WMR receives data representing network traffic using its first radio. In some examples, the first radio is operating at a first bandwidth such as 160 MHz. This first bandwidth may be referred to as a "normal" operating bandwidth. In some examples, the network traffic is a network packet.

At block 304, the "failed" WMR determines whether wireless communication with the second WMR meets a condition. In some examples, the condition is a failure condition. In some examples, the condition is whether communication link quality between the "failed" (first) WMR and a second WMR in the wireless mesh network backbone is below a predetermined threshold. In some examples, the condition is whether a threshold amount of network traffic was received from the second WMR within a threshold amount of time. In some examples, the condition is whether a radio of the "failed" WMR is experiencing hardware failure.

If the communication between the "failed" (first) WMR and the second WMR meets the condition (e.g., if there is a failure), processing proceeds to block 306 where the "failed" WMR activates its third radio. In addition, the "failed" WMR changes the bandwidths of its first radio and its second radio. In some examples, the change is a change to a second, narrower bandwidth (e.g., from 160 MHz to 80 MHz) to accommodate the additional (e.g., third) radio that is now active. Also, the third radio operates at a bandwidth different than the normal operating bandwidth of the first radio and/or the second radio. In some examples, the third radio operates at a narrower bandwidth. In some examples, the third radio also operates at the second bandwidth (e.g., 80 MHz).

In some examples, when the "failed" WMR enters the recovery mode of operation, it informs other network nodes in the wireless mesh network backbone of its status. In some examples, the "failed" (first) WMR requests a wireless communication connection with a third ("helper") WMR in the backbone. In some examples, the "failed" WMR informs a wireless access controller of the wireless mesh network backbone of its status so that the wireless access controller can request a wireless communication connection with the third ("helper") WMR on behalf of the "failed" (first) WMR.

At block 308, after establishing communication via its third radio with the third ("helper") WMR, the "failed" (first) WMR sends data representing the network traffic that was received at block 302 to the third ("helper") WMR using the third radio. After block 308, processing returns to block 302 where the "failed" WMR can determine whether it should continue to operate in recovery mode.

If the communication between the "failed" (first) WMR and the second WMR does not meet the condition (e.g., if there is no failure or no longer a failure), processing proceeds to block 310. At block 310, if the "failed" WMR is operating in recovery mode, it deactivates the third radio and returns the bandwidth of its first radio and second radio to the first bandwidth (e.g., increases from 80 MHz to 160 MHz), thereby returning the WMR to normal operation. At block 310, the "failed" (first) WMR also sends, to the second wireless network relaying device, data representing the network traffic using the second radio, at the first (e.g., wider) bandwidth.

It should be appreciated that the exact bandwidths used by the radios of the "failed" WMR can vary. For example, the bandwidths of 160 MHz (normal operation) and 80 MHz (recovery operation) are useful under some communication standards (e.g., ISM band) in certain jurisdictions. Other bandwidths are possible. Also, it should be appreciated that the bandwidths used by the first, second, and third radios can vary. In some examples, in recovery mode, the first radio reduces its bandwidth from a first, wider bandwidth to a second, narrower bandwidth. In some examples, in recovery mode, the first and second radios both reduce their bandwidths to the same narrower bandwidth. In some examples, in recovery mode, the operating bandwidths of all operating radios (e.g., three radios) are the same bandwidth. In some examples, the second, narrower bandwidth is half of the first, wider bandwidth. In some examples, the first, wider operating bandwidth is 160 MHz and the second, narrower bandwidth is 80 MHz. It should be appreciated that the goal of a WMR is to take up the available bandwidth by adjusting its radio bandwidths based on the number of radios that are operating and the communication standard under which the radios are operating, in some embodiments.

It should be appreciated that the sub-processes of processes 300 (FIG. 3) need not appear in the same order as they are presented in FIG. 3. For example, it is possible for a WMR to determine if a communication condition exists before receiving a data packet. Restated, it is possible for process 304 to be performed ahead of process 302.

Figure 4:
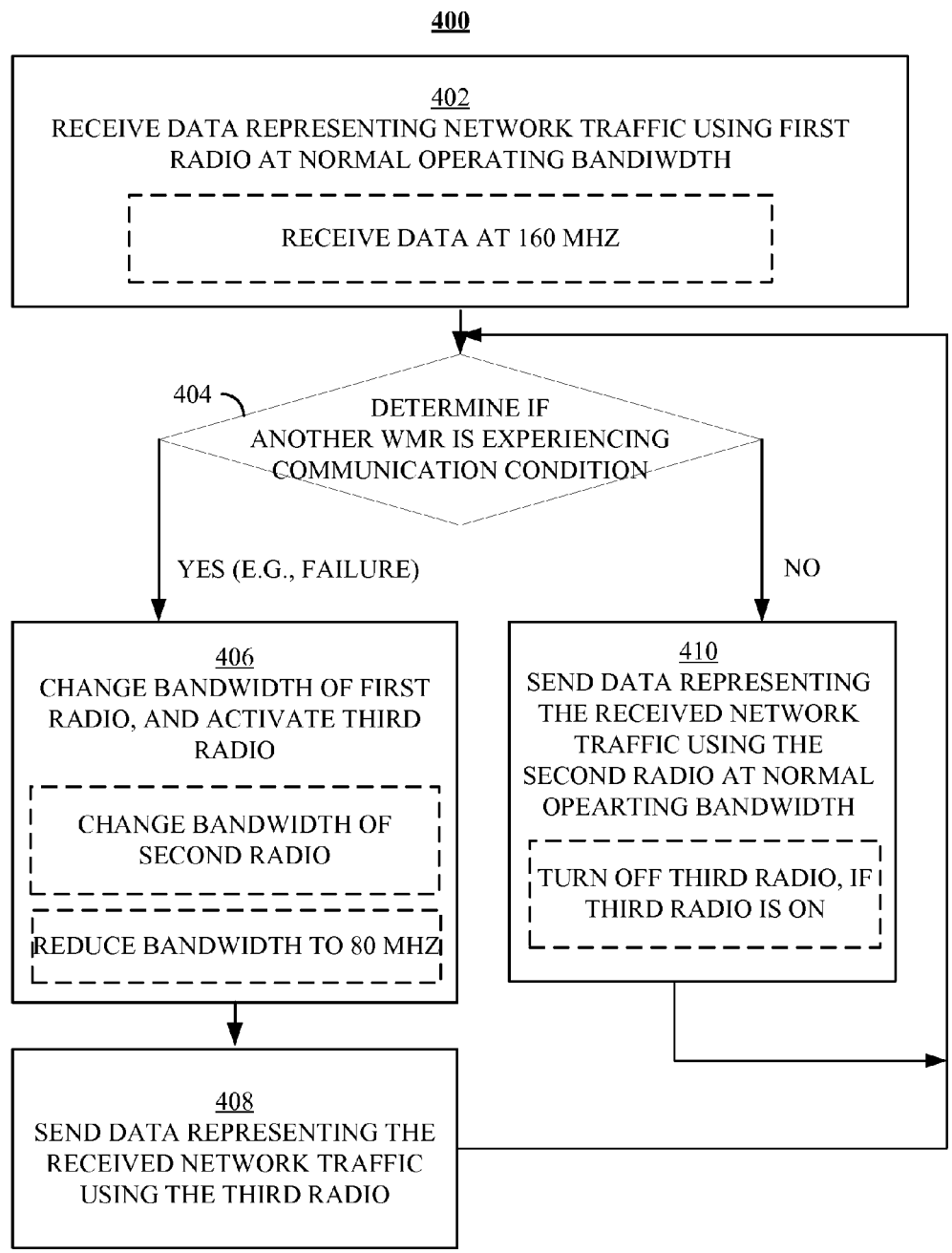
FIG. 4 is a flow diagram illustrating a process for recovering from communications conditions in accordance with some embodiments.

FIG. 4 illustrates exemplary process 400 for recovering network communication in a wireless mesh network backbone according to some embodiments. Process 400 is performed by a "helper" WMR, such as WMR 260 (FIG. 2), in a wireless mesh network backbone, in some examples. The "helper" WMR has a first radio, a second radio, and a third radio, in some examples.

At block 402, the "helper" WMR receives data representing network traffic using the first radio. In some examples, the first radio is operating at a first bandwidth, such as 160 MHz. In some examples, the network traffic is a network packet. The first bandwidth may be referred to as a "normal" bandwidth.

At block 404, the "helper" (first) WMR determines whether another WMR on the wireless mesh network backbone, such as a third WMR, is experiencing a communication condition. In some examples, the condition is a failure condition. In some examples, the condition is whether communication link quality between the third WMR and a second WMR in the wireless mesh network backbone is below a predetermined threshold. In some examples, the condition is whether a threshold amount of network traffic was received by the third WMR from the second WMR within a threshold amount of time. In some examples, the condition is whether a radio on the third WMR is experiencing a hardware failure.

If the third WMR is experiencing a communication condition (e.g., if there is a failure), processing proceeds to block 406 where the "helper" (first) WMR activates its third radio. In addition, the "helper" (first) WMR changes the bandwidth of its first radio and its second radio from the first bandwidth to a different bandwidth. In some examples, the change reduces the bandwidth to a narrower bandwidth to accommodate the additional (e.g., third) radio that is now active. For example, the bandwidth of a radio can be changed from 160 MHz to 80 MHz. Also, the third radio operates at a bandwidth different than the first bandwidth. In some examples, the third radio operates at a bandwidth narrower than the first bandwidth. In some examples, the third radio also operates at the bandwidth of the first and second radios (e.g., 80 MHz). In this way, the "helper" WMR enters recovery mode to help restore wireless mesh network backbone communication.

At block 408, after establishing communication via its third radio with the third ("failed") WMR, the "helper" (first) WMR sends data representing the network traffic that was received at block 402 to the third ("failed") WMR, using the third radio. After block 408, processing returns to block 402 where the "helper" (first) WMR determines whether it should continue to operate in recovery mode as a "helper".

If the third ("failed") WMR is not experiencing a communication condition (e.g., if there is no failure or no longer a failure), processing proceeds to block 410. At block 410, if the "helper" (first) WMR is operating in recovery mode, it deactivates the third radio and returns the bandwidth of its first radio and second radio to the first bandwidth, thereby returning the WMR to normal operation. In some examples, the operating bandwidths of the first and second radios on the "helper" (first) WMR widen from 80 MHz to 160 MHz. Also, at block 410, the "helper" (first) WMR sends to a second WMR, data representing the network traffic using its second radio at the first bandwidth.

In some examples, determining whether the third WMR is experiencing a communication condition comprises receiving a request from the third WMR for wireless communication connection in recovery mode. In some examples, determining whether the third WMR is experiencing a communication condition comprises receiving status information from a wireless access controller of the wireless mesh network backbone.

It should be appreciated that the exact bandwidths used by the radios of the "helper" WMR can vary. For example, the bandwidths of 160 MHz (normal operation) and 80 MHz (recovery operation) are useful under some communication standards (e.g., ISM band) in certain jurisdictions. Other bandwidths are possible. Also, it should be appreciated that the bandwidths used by the first, second, and third radios can vary. In some examples, in recovery mode, the first radio reduces its bandwidth from a first, wider bandwidth to a second, narrower bandwidth. In some examples, in recovery mode, the first and second radios both reduce their bandwidths to the same narrower bandwidth. In some examples, in recovery mode, the operating bandwidths of all operating radios (e.g., three radios) are the same bandwidth. In some examples, the second, narrower bandwidth is half of the first, wider bandwidth. In some examples, the first, wider operating bandwidth is 160 MHz and the second, narrower bandwidth is 80 MHz. It should be appreciated that the goal of a WMR is to take up the available bandwidth by adjusting its radio bandwidths based on the number of radios that are operating and the communication standard under which the radios are operating, in some embodiments.

It should be appreciated that the sub-processes of processes 400 (FIG. 4) need not appear in the same order as they are presented in FIG. 4. For example, it is possible for a WMR to determine if a communication condition exists before receiving a data packet. Restated, it is possible for process 404 to be performed ahead of process 402.

Pseudo-code representing computer processor-executable instructions usable to perform processes 300 and 400 (FIGS. 3 and 4) in some embodiments is provided below. Multi-threading is used to execute instructions on all of the radio interfaces of a wireless mesh network relaying device simultaneously, in some examples.

```
while true on thread #1
{
  probe the link quality from the radio of the neighborhood
WMR;
  if (the link quality < -y) or (time-out for response)
  {
    activate the 3rd radio;
    set the BW on all 3 radios to 80 MHz;
    probe the link quality from the radio of the
neighborhood WMR;
    while (the link quality < -y) or (time-out for response)
    {
      forward/receive data using the 3rd radio;
    }
    deactivate the 3rd radio;
    set the BW on the 1st and 2nd radios to 160 MHz;
  }}
while true on thread #2
{
listen for the requests for setting up backup path;
if (requested by a failing WMR that the backup path will be used)
{
  activate the 3rd radio;
  set the BW on all 3 radios to 80 MHz;
while not (received requests for tearing down backup path)
{
  forward/receive data using the 3rd radio;
}
  deactivate the 3rd radio;
  set the BW on the 1st and 2nd radios to 160 MHz;
}}
```

Figure 5:
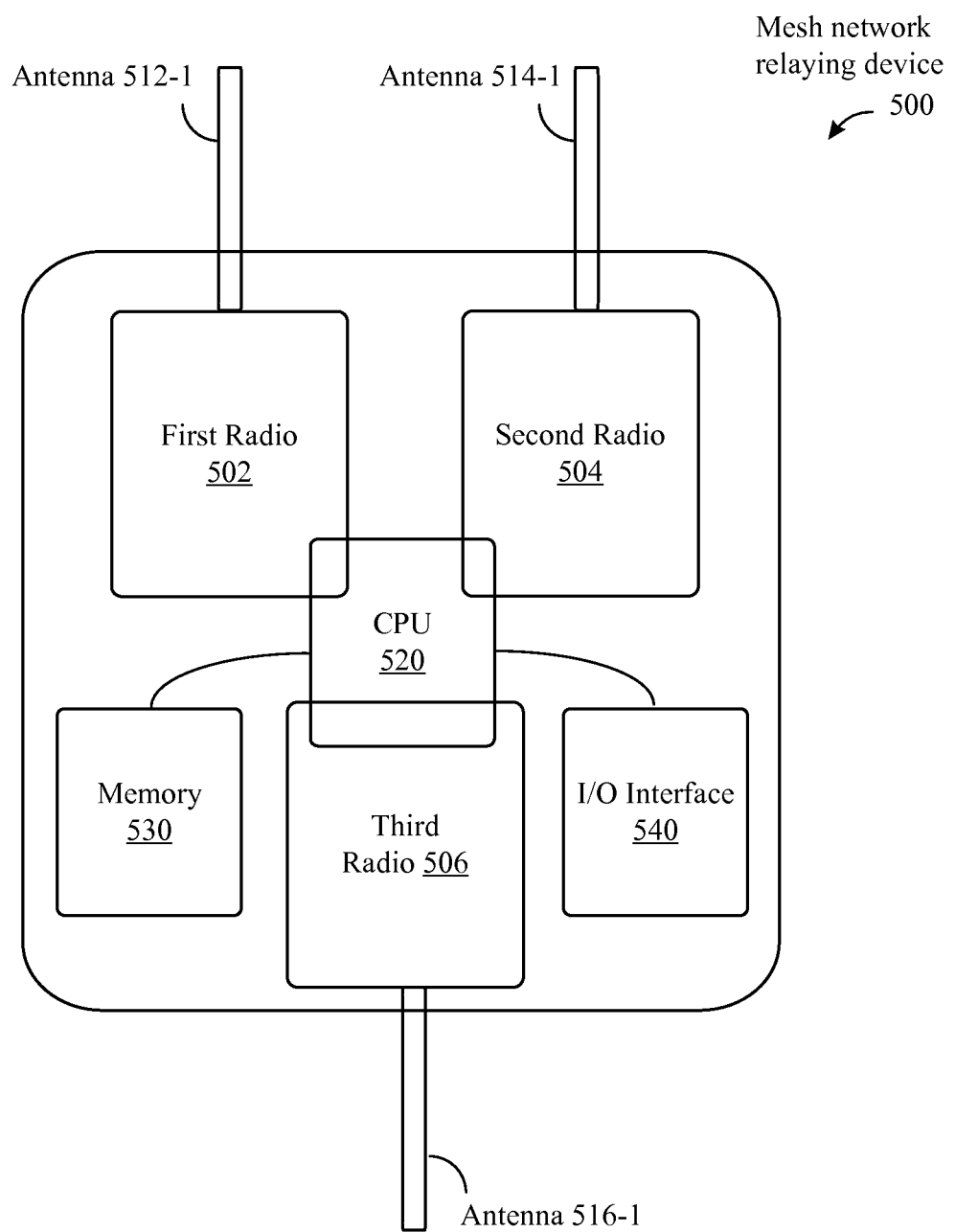
FIG. 5 is a block diagram of a wireless mesh network relaying device in accordance with some embodiments.

FIG. 5 depicts exemplary wireless mesh relaying device 500. Device 500 represents WMR 210 and/or WMR 260 (FIG. 2) in some embodiments. WMR 500 executes process 300 (FIG. 3) and/or process 400 (FIG. 4) to carry out the above-described techniques, including those described with reference to FIGS. 1 and 2, in some embodiments.

WMR 500 has a first WiFi radio 502, a second WiFi radio 504, and a third WiFi radio 506. The first WiFi radio 502 connects to antenna 512-1. The second WiFi radio 504 connects to antenna 514-1. The third WiFi radio 506 connects to antenna 516-1. Radios 502, 504, and 506 may operate more than one antenna. In some examples, radios 502, 504, and 506 are configurable to operate under various WiFi standards, such as the IEEE 802.11a/b/g/n/ac standards. In some examples, radios 502, 504, and 506 adjust to operate at different bandwidths (e.g., 40, 80, and 160 MHz).

Radios 502, 504, and 506 are connected to one or more computer processors (e.g., central processing unit) 520. The radios are inter-connected in this manner to support network data flow. For example, during normal operation, network data flows between first radio 502 and second radio 504.

During recovery operation as a "failed" mesh network relaying device, network data can flow between first radio 502 and third radio 506, or between second radio 504 and third radio 506, for example. During recovery operation as a "helper" mesh network relaying device, network data can flow between first radio 502, second radio 504, and third radio 506 as necessary for proper routing of network packets.

Processor 520 connects to memory 530 and input/output (I/O) interface 540. Memory 530 includes a non-transitory storage medium that stores instructions, such as instructions executable by processor(s) 520. In some examples, the instructions, when executed, cause WMR 500 to perform processes 300 (FIG. 3) and/or 400 (FIG. 4). I/O interface 540 includes a USB port that facilitates configuration of device 500, in some examples.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A computer-enabled method, comprising:
    at a first wireless network relaying device configured to operate in a wireless network backbone, wherein the first wireless network relaying device has at least a first radio, a second radio, and third radio:
    receiving data representing network traffic using the first radio, the first radio operating at a first bandwidth;
    determining whether a wireless communication between the second radio and a second wireless network relaying device meets a condition; and
    in accordance with a determination that the wireless communication between the second radio and the second wireless network relaying device meets the condition:
        operating the first radio, the second radio, and the third radio using non-overlapping channels at a second bandwidth different than the first bandwidth; and
        sending using the third radio, to a third wireless network relaying device, data representing the network traffic at the second bandwidth different than the first bandwidth;
    in accordance with a determination that the wireless communication between the second radio and the second wireless network relaying device does not meet the condition:
        operating the first radio and the second radio using non-overlapping channels at the first bandwidth; and
        sending using the second radio, to the second wireless network relaying device, data representing the network traffic.

2. The computer-enabled method of claim 1, wherein determining whether wireless communication with the second wireless network relaying device meets a condition comprises:
    determining whether a measurement of communication link quality is below a predetermined threshold.

3. The computer-enabled method of claim 1, wherein determining whether wireless communication with the second wireless network relaying device meets a condition comprises:
    determining whether a threshold amount of network traffic was received from the second wireless network relaying device within a threshold amount of time.

4. The computer-enabled method of claim 1, the method further comprising:
    in accordance with a determination that the wireless communication with the second wireless network relaying device meets the condition, activating the third radio.

5. The computer-enabled method of claim 1, the method further comprising:
    in accordance with a determination that the wireless communication with the second wireless network relaying device meets the condition, requesting a wireless communication connection with the third wireless network relaying device.

6. The computer-enabled method of claim 1, wherein the second bandwidth is narrower than the first bandwidth.

7. The computer-enabled method of claim 1, the method further comprising:
    in accordance with a determination that the wireless communication with the second wireless network relaying device meets the condition, changing the bandwidth of the second radio.

8. The computer-enabled method of claim 1, wherein the second bandwidth is half the first bandwidth.

9. A computer-enabled method, comprising:
    at a first wireless network relaying device configured to operate in a wireless network backbone, wherein the first wireless network relaying device has at least a first radio, a second radio, and third radio:
    receiving data representing network traffic using the first radio, the first radio operating at a first bandwidth;
    determining whether a third wireless network relaying device is experiencing a communication condition;
    in accordance with a determination that the third wireless network relaying device is not experiencing a communication condition:
        operating the first radio and the second radio using non-overlapping channels;
        sending, to a second wireless network relaying device, data representing the network traffic, using the second radio, at the first bandwidth; and
    in accordance with a determination that the third wireless network relaying device is experiencing a communication condition:
        operating the first radio, the second radio, and the third radio using non-overlapping channels;
        sending, to the second wireless network relaying device, data representing the network traffic, using the second radio, at a bandwidth different than the first bandwidth; and
        establishing wireless communication with the third wireless network relaying device, using the third radio, at a bandwidth different than the first bandwidth.

10. The computer-enabled method of claim 9, wherein determining whether the third wireless network relaying device is experiencing a communication condition comprises receiving a request for wireless communication connection with the third wireless network relaying device.

11. The computer-enabled method of claim 10, wherein receiving the request for wireless communication connection with the third wireless network relaying device comprises receiving the request directly from the third wireless network relaying device.

12. The computer-enabled method of claim 9, further comprising:

in accordance with detecting the third wireless network relaying device is experiencing a communication condition, activating the third radio.

13. The computer-enabled method of 12, further comprising:
in accordance with detecting the third wireless network relaying device is not experiencing a communication condition, deactivating the third radio.

14. The computer-enabled method of claim 9, the method further comprising:
in accordance with detecting the third wireless network relaying device is experiencing a communication condition, changing the bandwidth of the first radio to a different bandwidth.

15. The computer-enabled method of claim 14, wherein changing the bandwidth of the first radio and changing the bandwidth of the second radio comprises changing the bandwidths of the first radio and the second radio to a second bandwidth.

16. The computer-enabled method of claim 15, wherein the second bandwidth is narrower than the first bandwidth.

17. The computer-enabled method of claim 9, wherein changing the bandwidth of the second radio comprises changing the bandwidth of the second radio to a second bandwidth, and
wherein establishing communication with the third wireless network relaying device, using the third radio, comprises communicating with the third wireless network relaying device at the second bandwidth.

18. The computer-enabled method of claim 17, wherein the second bandwidth is narrower than the first bandwidth.

19. The computer-enabled method of claim 9, further comprising:
in accordance with detecting the third wireless network relaying device is experiencing a communication condition, operating the first radio, the second radio, and the third radio at a second bandwidth.

20. The computer-enabled method of claim 19, wherein the second bandwidth is narrower than the first bandwidth.

21. The computer-enabled method of claim 20, wherein the second bandwidth is half the first bandwidth.

22. A non-transitory computer-readable storage medium having computer-executable instructions, wherein the computer-executable instructions, when executed by one or more processors of a wireless network relaying device having at least a first radio, a second radio, and a third radio, causes the wireless network relaying device to change the operating bandwidth of at least one radio of the wireless network relaying device, the computer-executable instructions comprising instructions for:
receiving data representing network traffic using the first radio of the wireless network relaying device, the first radio operating at a first bandwidth;
determining whether a wireless communication between the second radio and a second wireless network relaying device meets a condition; and
in accordance with a determination that the wireless communication between the second radio and the second wireless network relaying device meets the condition:
operating the first radio, the second radio, and third radio using non-overlapping channels at a second bandwidth different than the first bandwidth; and
sending using a third radio of the wireless network relaying device, to a third wireless network relaying device, data representing the network traffic at the second bandwidth different than the first bandwidth;
in accordance with a determination that the wireless communication between the second radio and the second wireless network relaying device does not meet the condition:
operating the first radio and the second radio using non-overlapping channels at the first bandwidth; and
sending using the second radio, to the second wireless network relaying device, data representing the network traffic.

23. A non-transitory computer-readable storage medium having computer-executable instructions, wherein the computer-executable instructions, when executed by one or more processors of a wireless network relaying device having at least a first radio, a second radio, and a third radio, causes the wireless network relaying device to change the bandwidth of at least one radio of the wireless network relaying device, the computer-executable instructions comprising instructions for:
receiving data representing network traffic using the first radio of the wireless network relaying device, the first radio operating at a first bandwidth;
determining whether a third wireless network relaying device is experiencing a communication condition;
in accordance with a determination that the third wireless network relaying device is not experiencing a communication condition:
operating the first radio and the second radio using non-overlapping channels;
sending, to a second wireless network relaying device, data representing the network traffic, using the second radio of the wireless network relaying device, at the first bandwidth; and
in accordance with a determination that the third wireless network relaying device is experiencing a communication condition:
operating the first radio, the second radio, and the third radio using non-overlapping channels;
sending, to the second wireless network relaying device, data representing the network traffic, using the second radio, at a bandwidth different than the first bandwidth; and
establishing wireless communication with the third wireless network relaying device, using the third radio of the wireless network relaying device, at a bandwidth different than the first bandwidth.

24. A network relaying device comprising:
a first radio, a second radio, and a third radio coupled to one or more processors;
a memory coupled to the one or more processors; and
one or more programs, wherein the one or more programs are stored in the memory and configured to be executed by the one or more processors, the one or more programs including instructions for:
receiving data representing network traffic using the first radio, the first radio operating at a first bandwidth;
determining whether a wireless communication between the second radio and a second wireless network relaying device meets a condition; and
in accordance with a determination that the wireless communication between the second radio and the second wireless network relaying device meets the condition:

operating the first radio, the second radio, and the third radio using non-overlapping channels at a second bandwidth different than the first bandwidth; and sending using the third radio, to a third wireless network relaying device, data representing the network traffic at the second bandwidth different than the first bandwidth;

in accordance with a determination that the wireless communication between the second radio and the second wireless network relaying device does not meet the condition:

operating the first radio and the second radio using non-overlapping channels at the first bandwidth;

sending using the second radio, to the second wireless network relaying device, data representing the network traffic.

25. A network relaying device comprising:

a first radio, a second radio, and a third radio coupled to one or more processors;

a memory coupled to the one or more processors; and one or more programs, wherein the one or more programs are stored in the memory and configured to be executed by the one or more processors, the one or more programs including instructions for:

receiving data representing network traffic using the first radio, the first radio operating at a first bandwidth;

determining whether a third wireless network relaying device is experiencing a communication condition;

in accordance with a determination that the third wireless network relaying device is not experiencing a communication condition:

operating the first radio and the second radio using non-overlapping channels;

sending, to a second wireless network relaying device, data representing the network traffic, using the second radio, at the first bandwidth; and in accordance with a determination that the third wireless network relaying device is experiencing a communication condition:

operating the first radio, the second radio, and the third radio using non-overlapping channels;

sending, to the second wireless network relaying device, data representing the network traffic, using the second radio, at a bandwidth different than the first bandwidth; and establishing wireless communication with the third wireless network relaying device, using the third radio, at a bandwidth different than the first bandwidth.

* * * * *